Figure 1:
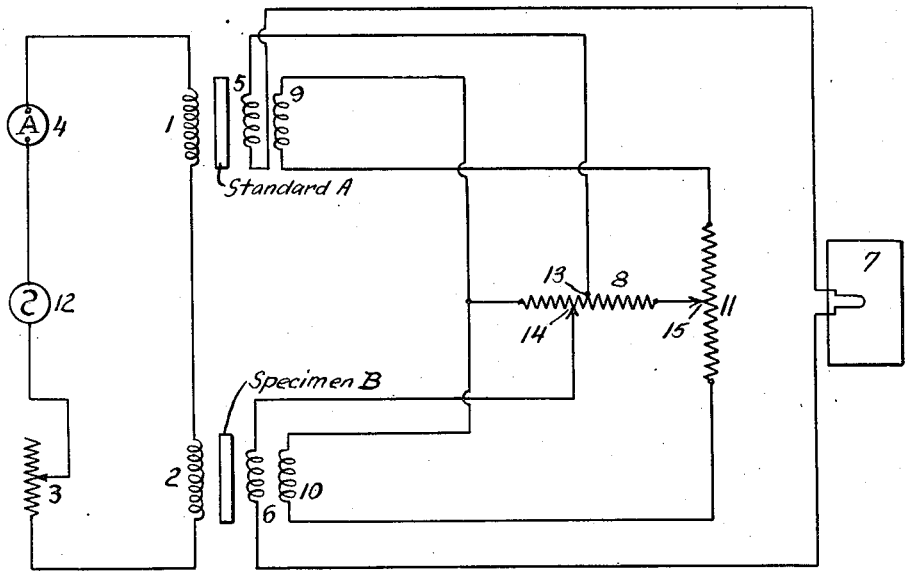

March 17, 1936.  T. ZUSCHLAG  2,034,501

MAGNETIC ANALYSIS

Filed Nov. 3, 1933

Theodor Zuschlag
INVENTOR

BY
Pennie, Davis, Marvin & Edmonds
ATTORNEYS

Patented Mar. 17, 1936

2,034,501

UNITED STATES PATENT OFFICE 2,034,501

MAGNETIC ANALYSIS

Theodor Zuschlag, Englewood, N. J., assignor to Magnetic Analysis Corporation, Long Island City, N. Y., a corporation of New York Application November 3, 1933, Serial No. 696,477

16 Claims. (Cl. 175—183)

This invention relates to magnetic analysis and has for its object certain improvements in the method of and apparatus for the investigation of magnetizable specimens to determine physical and metallurgical properties thereof. More specifically, the invention contemplates improvements in the art of determining the differences in physical properties between magnetizable specimens of unknown character and magnetizable standards whose properties are known, by means of variations in an induced secondary current.

In magnetic analysis comparative tests are conducted to determine the magnetic relationship between a specimen to be tested and a standard, as reflected in the magnitude and other characteristics of a secondary current induced in suitable secondary coils by the flux set up in the specimen and the standard by appropriate primary coils. When the magnetizing current in the primary coils is alternating in character, each cycle produces a corresponding cycle of induced current in the secondary coils, and when the secondary coils are connected in series opposition the induced differential current will have certain characteristics dependent in some degree upon variations of magnetic properties between the specimen and the standard.

In making a magnetic analysis of this kind, a standard and a specimen are respectively placed in the fields of a pair of separate and substantially similar primary coils energized by a common alternating current source. A secondary coil is disposed in inductive relationship to each primary coil, usually by locating the secondary coil within the primary coil in axial alignment therewith. The two secondary coils are connected in series opposition; that is, the poles of similar sign are connected to each other so that the electromotive forces induced in the coils are opposite in direction. The standard and specimen are thus subjected simultaneously to a magnetizing force. If the magnetic properties of the standard and the specimen are exactly the same, in the ideal case there will be no resultant measurable electrical effect in the secondary circuit because the induced electromotive forces cancel each other. However, should the specimen and standard be dissimilar in magnetic properties, a differential current is induced in the secondary circuit. This differential secondary current is measured by suitable means, such as an oscillograph, and may be utilized to disclose the character and extent of the variation in magnetic properties between the specimen and the standard.

In the ideal case, such as has been described, the magnitude and characteristics of the induced differential current in the secondary circuit is dependent only upon the variation in magnetic properties between the specimen and the standard. Unfortunately, in practice there are other factors which influence the induced current, thus impairing the accuracy of the indications and vitiating to some extent the interpretation of the readings. The ideal case is seldom if ever realized, because of the part which these other factors play in influencing the character and magnitude of the induced differential current. The geometrical arrangement of the different parts of the testing apparatus may and frequently does exert a marked influence upon the secondary current. So too, does the arrangement of the wiring in the testing circuit. Stray currents will also have an effect upon the induced differential currents. In fact, any extraneous force which tends to induce electromotive forces in the secondary circuit will influence the results and impair the accuracy of the observation.

While the effect of extraneous forces is not, in all instances, sufficiently great to vitiate results of magnetic analysis, it is usually objectionable. In the heretofore customary art of magnetic analysis considerable effort has been expended in order to devise schemes by which the effect of extraneous forces may be compensated for or eliminated. However even when such compensation for or elimination of foreign influences is obtained, very frequently the results are not satisfactory for the reason that the induced secondary current is of such magnitude that minor variations in it due to some particular defect or characteristic sought are difficult to identify. The induced secondary current resulting after compensation is known as the true steel balance, which may be very great in the case of two specimens from different heats. In the event that such samples are being compared in a search for a fine seam or similar defect, the current change which is superimposed upon the true steel balance may be such a small proportion of the total current as to be unrecognizable.

It will be apparent that the magnitude of the secondary current induced may be great or small, depending upon the dissimilarity of magnetic characteristics in the standard and specimen. When the magnetic characteristics are nearly the same the current will be small and the indicating means must be exceedingly sensitive in order that the current may be accurately determined. This is the condition frequently encountered when steel samples from the same heat are compared, and the chief difference in magnetic characteristics is caused by minute flaws or fine seams in the samples. On the other hand, the induced secondary current may be very great in the case where two steel samples from different heats are compared, and where the physical structure and/or metallurgical constituents of the samples are at wide variance. An instrument that will indicate minor differences in structure with accuracy is entirely unsuitable to denote the difference between two samples which are at wide variance with one another, because such an instrument does not have the necessary range. Many attempts have been made to remedy this condition by changing the sensitivity of the recording instrument by one means or another. Such attempts frequently have involved the use of additional apparatus, and usually have not proved to be satisfactory. In some cases the range of adjustment has been too narrow to cover the limits met in commercial testing. Other attempts at solving this problem have failed because the method and equipment proved to be too complicated for use under practical conditions. Still other efforts to solve the problem by increasing the effective range of the indicating means have resulted in a reduction in the sensitivity below that required for accurate results. Thus the apparatus and methods heretofore proposed as remedies for the problem of varying range in the indication of magnetic differences have been largely unsatisfactory due to excessively elaborate equipment, complicated methods, insufficient width of range, or sacrifice of accurate results.

As a result of my investigations in the art I have determined a method of and apparatus for such magnetic analyses according to which the difficulties previously referred to may be largely overcome and in which the disadvantages of the heretofore customary compensating devices are in great measure eliminated. In the novel method and apparatus which I employ two secondary coils are associated with each primary coil, instead of a single secondary coil as in the prior art. One pair of secondary coils is connected in series opposition to an indicating means and to the midpoint and sliding contact of the potentiometer. The other pair of secondary coils is connected in series opposition to the extremities of another potentiometer. One extremity of the first potentiometer is connected to the movable contact of the second potentiometer while the other extremity of the first potentiometer is connected to the common end of the second pair of secondary coils. By employing the double pair of secondary coils in the novel arrangement described above, I am able to obtain satisfactory compensation of extraneous electromotive forces which adversely affect the indications of difference in the magnetic characteristics of a specimen and a standard, without however, impairing the sensitivity of the apparatus. The apparatus of my present invention are relatively simple in construction and their rugged character plus low cost make them especially adaptable for large scale commercial testing. The method of my invention is simple and exact, so that its use promotes speed and accuracy in testing, even when used by comparatively inexperienced operators.

A further understanding of the present invention may be obtained by referring to the accompanying drawing, taken in conjunction with the following description, in which:

Fig. 1 diagrammatically illustrates an apparatus of the invention, and

Figure 2:
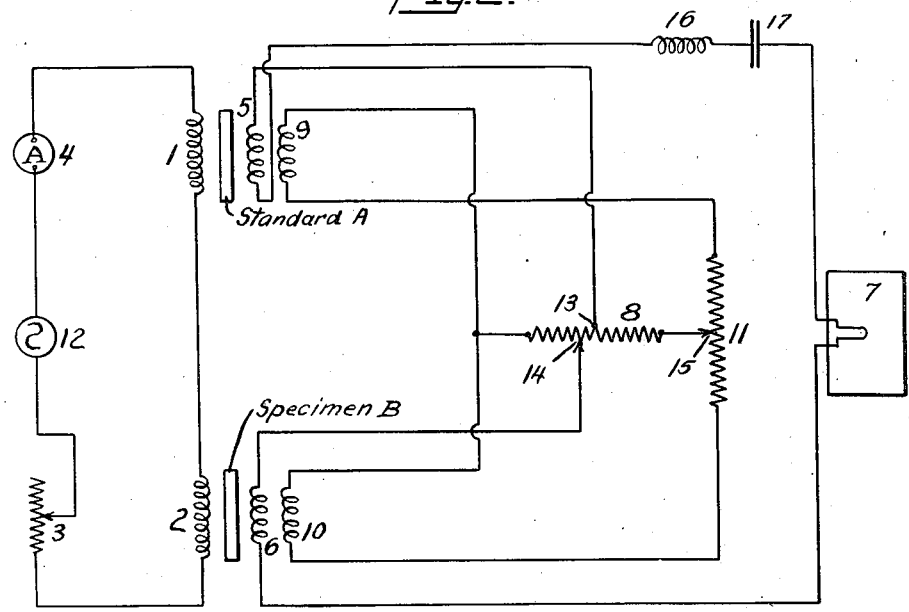

Fig. 2 diagrammatically illustrates a further modification of the apparatus of the invention.

Referring to Fig. 1, two substantially identical primary coils 1 and 2 are connected in series with a variable resistance 3, a suitable alternating current source 12 and an ammeter 4. The primary coils 1 and 2 are preferably made of a suitable number of turns of insulated copper wire or other metallic conductor. A pair of secondary coils, 5 and 6, which are preferably constructed of a suitable number of turns of insulated wire of low ohmic resistance, and substantially identical in size, is connected in series opposition to a suitable indicating means 7, such as an oscillograph, and to a middle fixed contact 13 and a movable contact 14 of a potentiometer 8. A second pair of substantially identical secondary coils, 9 and 10, of insulated wire is connected in series opposition of the extreme contacts of a second potentiometer 11. The extreme contacts of the first potentiometer 8 are connected in bridge relationship between the sliding contact 15 of the second potentiometer 11 and the common connection of the second pair of secondary coils 9 and 10.

Both pairs of secondary coils (5, 6, 9 and 10) are preferably of similar design containing the same number of coils of insulated wire. They are located in inductive relationship to the respective primary coils 1 and 2, as by placing the first pair of secondaries within their respective primary coils in axial alignment therewith, with the second pair of secondary coils placed in axial alignment within the first pair of secondary coils. In other words each set of primary and secondary coils is preferably arranged so that the secondary coils are telescoped within the primary coil, with a primary coil forming the outer ring, the first secondary coil the intermediate, and the second secondary coil the innermost ring. The metallic leads used throughout the primary and secondary circuits, and indicated on the drawing, are preferably insulated wires of low resistance.

The potentiometers 8 and 11 employed are of the type adapted for measurement of alternating current and comprise substantially non-inductive slide resistances of uniform cross section.

The functions performed by the various parts of the apparatus will be more thoroughly understood when the methods of operation are considered. In each of the several preferred methods of operation of the apparatus according to Fig. 1, the circuit is first tested for a balanced condition with air cores; that is, with no magnetizable bodies inserted in the coils. Should there be a deflection of indicator 7 under these conditions, such deflection is eliminated by appropriate adjustments of the potentiometers 8 and 11. In a properly constructed apparatus, in which the two transformer sets, each consisting of a primary and two secondary coils, are substantially identical, the circuit under air core conditions should require very little adjustment; and a zero reading of indicator 7 should be obtained with the sliding contacts of potentiometers 8 and 11 located close to the midpoints of their respective potentiometers.

The following method may be used when the differences in magnetizable characteristics between the standard and the specimens to be tested are small enough to induce differential currents that may be conveniently noted on the indicator scale without changing the settings of the potentiometers 8 and 11 from the points established by balance under air core condiditions. A standard A of known properties is inserted in the field of coils 1, 5 and 9 and a specimen B, whose properties are to be determined, is inserted in the field of coils 2, 6 and 10. The indicator will be deflected in proportion to the difference in the magnetic properties. The reading of the indicator is noted. If several specimens are to be examined, specimen B is replaced by another specimen C, and the resulting deflection is noted. The readings serve to determine the difference in physical and metallurgical properties between the standard and one of the specimens, or to denote the differences between two specimens. The interpretation of the readings is made by means known in the art.

The differences between a standard magnetizable body and the specimens to be tested is frequently greater than can be observed upon the indicator 7 without adjustment of the potentiometer. In this case, such as when steel samples from two or more heats are being tested and the differences in properties are likely to be great, the following preferred method may be applicable. The apparatus is first balanced for air core condition as previously described, the reading of indicator 7 being reduced to zero by adjustment of the potentiometers 8 and 11. A standard A is inserted in the field of coils 1, 5 and 9 and a specimen B is placed in the field of coils 2, 6 and 10. The resultant deflection, in the case of wide dissimilarity between specimen and standard, will be great; but by adjustment of the sliders on potentiometers 8 and 11, a minimum deflection can be obtained. Such adjustment is made. The potentiometer settings and the indicator reading are noted. The specimen B is then replaced by a second specimen C and the procedure for obtaining a minimum deflection is repeated. The readings of potentiometers 8 and 11 and the indicator 7 are again noted, and the values for the balanced conditions for samples B and C then serve as a means for differentiating between the two, in so far as magnetic characteristics are concerned.

The method may be simplified to a considerable degree by inserting a suitable filter in the circuits 5, 6, 7 and 8, as shown in Fig. 2. Such a filter may comprise an inductive resistance 16 and a condenser 17 so adjusted that only the base frequency of the circuit is allowed to pass. Other well known types of harmonic filters may be used in place of the one shown, the aim being to eliminate all but the base frequency and to suppress other harmonics that tend to interfere in the determination of the differences in magnetic qualities of the specimens and the standard. The use of a filter simplifies the determination and the interpretation of results, and its use in this capacity is preferred.

The foregoing method of magnetic analysis by what may conveniently be designated as the "minimum deflection" principle is somewhat tedious to perform, in that it involves resetting the sliding contacts of potentiometers 8 and 11 for each specimen. The results obtained are very accurate, but for certain types of work speed of operation is sufficiently important to warrant the employment of the following modification in which greater speed is obtained without sacrificing accuracy to an appreciable degree. In this modification, or third method of operation, the following procedure is employed:

A standard $A_1$ is introduced into the field of coils 1, 5 and 9 and a substantially identical standard $A_2$, that is one whose magnetic characteristics approximate those of the standard $A_1$, is placed in the field of the coils 2, 6 and 10. The sliding contacts of potentiometers 8 and 11 are then adjusted until a minimum deflection of indicator 7 is obtained. Then the reading of the indicator 7 is noted, and the standard $A_2$ is replaced by a specimen B, without further adjustment of the potentiometers 8 and 11. The new reading of indicator 7 for the differential current imposed by specimen B is then observed, and comparison of this specimen with the standard is effected through the medium of the respective readings of the indicator 7 instead of through the potentiometer settings.

The principles involved in the apparatus and method of my present invention may be further explained as follows: In order to compensate for influences upon the character and amount of induced current in the secondary circuits 5, 7, 6, 8 which do not result from differences in the magnetic characteristics of the specimen and standard, another secondary circuit containing identical coils 9 and 10 and the potentiometer 11 is employed. In the ideal case the differential currents induced in the coils will be the same and no compensation would be necessary. However, in a practical apparatus the geometrical arrangement of the coils, minute differences in construction of the coils, disposition of the wiring and possible stray electrical forces may cause unequal currents to flow in the circuits even in the case of an air core condition. The current frequency in circuits 5, 7, 6, 8 and 9, 11, 10 is the same because induced from a common primary current source, but the effective value or amplitude of the differential current in the two circuits is dependent upon the extraneous influences already referred to. These extraneous influences also affect the phase relationship of the two circuits, and in practical apparatus there is almost always some difference in phase which must be eliminated. In order to balance the two circuits so that no current will flow and the indicator 7 will show a zero reading, the amplitude of the currents in both circuits must be equal and the phases of both circuits must coincide. When this condition is obtained the apparatus will indicate the true difference between two magnetizable objects inserted into the fields of the respective sets of coils, that is into the fields of coils 1, 5 and 9 and of coils 2, 6 and 10.

Although potentiometers 8 and 11 are somewhat interdependent in their effect, potentiometer 11, connected in bridge relationship with coils 9 and 10, is chiefly effective as a phase shifter, since by increasing the resistance in series with secondary coil 10 while decreasing the resistance in series with coil 9 the phase of the circuits 9, 11, 10, 8 may be lagged or advanced. On the other hand, the potentiometer 8 is chiefly effective in the adjustment of amplitude between the two circuits by increasing or decreasing the resistances to be overcome by the opposing electromotive forces of the two circuits. It is apparent, therefore, that in order to compensate for both amplitude and phase, adjustment of both potentiometers 8 and 11 is necessary. By obtaining a zero reading by such adjustment the compensation of both phase and amplitude is assured.

Having adjusted the potentiometers under air core conditions as described previously, the elimination of the effect of extraneous influences is obtained, and subsequent comparison of the specimens and standard by the methods outlined will give the true differences in magnetic characteristics.

The apparatus and methods of this invention are particularly applicable when it is necessary to compare two different steel samples in a search for minor defects. The particular difference between two such samples is usually manifested by a slight current variation in the secondary circuit; and this quantity will be small as compared to the value of induced currents which are the result of other influences. In the case of uncompensated apparatus the effect of the extraneous influence is so great that the indicator scale is exceeded and the sensitivity of the instrument must be reduced in order that the readings may be recorded on the scale. The accuracy of the results is thus impaired. Even when the readings do fall upon the scale without reduction in the sensitivity of the system, the difference in readings due to the slight variance in character of the sample may be too small a proportion of the total readings to permit a reliable analysis. However, when using the apparatus of this invention such difficulties are overcome. By adjusting the potentiometers the effect of factors which have no bearing upon the character of the samples may be wiped out, thus emphasizing the true difference between the samples and facilitating recognition of the particular quality or defect which is sought.

The utility of the apparatus is not however, limited to cases when minor defects or slight changes in properties are sought to be discovered. In cases where the differences between samples are great, the sensitivity of the apparatus may be reduced by shifting the movable contacts of the potentiometers to accommodate the readings upon the scale of the indicator.

I claim:

1. A method of magnetic analysis which comprises simultaneously establishing a magnetic flux in two standards of similar magnetic properties, utilizing said magnetic fluxes to induce currents in a pair of secondary coils associated respectively with said standards, simultaneously inducing secondary currents in a second pair of secondary coils associated respectively with said standards, balancing the currents induced in said two pairs of coils against each other, replacing one of said standards by a specimen to be tested, and noting the current produced in the first pair of coils as a result of said replacement.

2. A method of magnetic analysis which comprises, establishing a fluctuating magnetic field simultaneously around two primary induction coils, utilizing said magnetic fields to induce currents in two pairs of secondary coils, one coil of each pair of secondary coils being associated respectively with one of said primary coils, balancing the current flow between the two pairs of secondary coils by means of appropriate resistance, inserting a standard and a specimen respectively into said magnetic fields, and noting the resulting current flow.

3. A method of magnetic analysis which comprises, establishing a fluctuating magnetic field simultaneously around two primary induction coils, utilizing said magnetic fields to induce currents in two pairs of secondary coils, one coil of each pair of secondary coils being associated respectively with one of said primary coils, balancing the current flow between the two pairs of secondary coils and causing the phase of the current in both pairs of secondary coils to coincide by means of appropriate resistances, inserting a standard and a specimen respectively into said magnetic fields, and noting the resultant current flow in the secondary coils.

4. A method of magnetic analysis which comprises, establishing a fluctuating magnetic field simultaneously around two primary induction coils under air core conditions, utilizing said magnetic fields to induce currents in two pairs of secondary coils, one coil of each pair of secondary coils being associated respectively with one of said primary coils, equalizing the current flow and adjusting the phase relationship between the two pairs of secondary coils under air core conditions, introducing a specimen and a standard respectively into said magnetic fields, and observing the resultant flow of current in the secondary coils.

5. A method of magnetic analysis which comprises, setting up a fluctuating magnetic field around two primary coils with which are associated two standards of substantially equal magnetic properties, utilizing said magnetic fields to induce currents in two pairs of secondary coils, one coil of each pair of secondary coils being associated respectively with one of said primary coils, equalizing the current flow between each pair of secondary coils by means of appropriate resistances, replacing one of said standards by a specimen to be tested, and observing the resultant current in one pair of secondary coils.

6. A method of magnetic analysis which comprises, setting up a fluctuating magnetic field simultaneously in two specimens of substantially identical magnetic properties, utilizing said magnetic fields to induce opposing currents in a pair of secondary coils, one coil of said pair of secondary coils being associated respectively with a specimen, simultaneously inducing opposing currents with said magnetic fields in a second pair of secondary coils, each coil of said second pair of secondary coils being associated respectively with a specimen, balancing the current flow in the two pairs of secondary coils by means of appropriate potentiometer adjustments, replacing one standard by a specimen to be tested, and noting the resultant current flow in one pair of secondary coils.

7. In a method of magnetic analysis, the steps which comprise setting up a fluctuating magnetic field simultaneously in a specimen and a standard, utilizing said magnetic fields to induce currents in a pair of secondary coils, opposing the currents thus induced, simultaneously inducing other currents with said magnetic fields in a second pair of secondary coils, combining the currents induced in the second pair of secondary coils, utilizing the currents produced in the said second pair of secondary coils to compensate for extraneous currents induced in said first pair of secondary coils by electro-magnetic forces other than those arising from differences in the magnetic properties of the specimen and the standard, and noting the current flow in said first pair of secondary coils.

8. In a method of magnetic analysis involving the measurement of a differential secondary current flowing in a secondary circuit and resulting from the opposition of current induced in two secondary coils, the improvement which comprises utilizing a differential current induced in another pair of secondary coils inductively associated respectively with two different magnetic fields to compensate for currents induced in said circuit.

9. In a method of magnetic analysis involving the measurement of a differential secondary current flowing in a secondary circuit and resulting from opposition of currents induced in a pair of secondary coils, the improvement which comprises balancing the current flow in the secondary circuit under air core conditions by introducing into said secondary circuit current induced in a pair of auxiliary secondary coils inductively associated respectively with two different magnetic fields.

10. In a method of magnetic analysis involving the measurement of a differential secondary current flowing in a secondary circuit and resulting from opposition of currents induced in a pair of secondary coils, the improvement which compries introducing two substantially identical standards of known magnetic properties into inductive relationship respectively with said secondary coils and balancing the current flow in the secondary circuit by introducing into said secondary circuit current induced in a pair of auxiliary secondary coils which are also in inductive relationship respectively with the two substantially identical standards of known magnetic properties.

11. In a method of magnetic analysis involving the measurement of a differential current flowing in a secondary circuit and resulting from opposition of currents induced in a pair of secondary coils, the improvement which comprises introducing into said circuit current induced in another pair of secondary coils and varying the resistance of said circuit to adjust the phase relationship between the currents flowing in each pair of secondary coils.

12. In a method of magnetic analysis involving the measurement of a differential current flowing in a secondary circuit and resulting from opposition of currents induced in a pair of secondary coils, the improvement which comprises introducing into said circuit current induced in another pair of secondary coils and varying the resistance in said circuit to adjust the amplitude relationship between the currents induced in each pair of secondary coils.

13. A method of magnetic analysis which comprises establishing a fluctuating magnetic field around two primary coils, utilizing said magnetic fields simultaneously to induce currents in two pairs of secondary coils, each pair of secondary coils being inductively associated with both of the primary coils, equalizing the current flowing between each pair of secondary coils with no magnetizable objects in said magnetic fields, inserting a standard and a specimen respectively into said magnetic fields and determining the resultant current induced in the secondary coils.

14. A method of magnetic analysis which comprises disposing a magnetizable body in inductive relationship with two secondary coils, disposing a second magnetizable body in inductive relationship with two other secondary coils, simultaneously setting up fluctuating magnetic currents in both magnetizable bodies thereby inducing secondary currents in the secondary coils, opposing the secondary current induced in one coil associated with one magnetizable body to the secondary current induced in a coil associated with the other magnetizable body, opposing a current induced in the remaining coil associated with one magnetizable body to the current induced in the remaining coil associated with the other magnetizable body, utilizing the resultant differential current flowing between two secondary coils to compensate for extraneous currents induced in the other secondary coils, and measuring the current flow in said other secondary coils.

15. A method of magnetic analysis which comprises disposing a magnetizable body in inductive relationship with two secondary coils, disposing a second magnetizabe body in inductive relationship with two other secondary coils, simultaneously setting up fluctuating magnetic fields in both magnetizable bodies thereby inducing secondary currents in the secondary coils, opposing the secondary current induced in one coil associated with one magnetizable body to the second current induced in the coil associated with the other magnetizable body, opposing the current induced in the remaining coil associated with one magnetizable body to the current induced in the remaining coil associated with the other magnetizable body, utilizing the resultant differential current flow between two secondary coils to compensate for currents induced in the other pair of secondary coils by forces other than those arising from differences in the properties of the magnetizable bodies under investigation.

16. A method of magnetic analysis which comprises disposing a magnetizable body in inductive relationship with two secondary coils, disposing a second magnetizable body in inductive relationship with two other secondary coils, simultaneously setting up a fluctuating magnetic field in both magnetizable bodies by means of alternating current derived from a common source thereby inducing secondary currents in the secondary coils, opposing the secondary current induced in one coil associated with one magnetizable body to the secondary current induced in a coil associated with the other magnetizable body, opposing the current induced in the remaining coil associated with one magnetizable body to the current induced in the remaining coil associated with the other magnetizable body and utilizing the resultant differential current flowing between two secondary coils to compensate for extraneous currents induced in the other two secondary coils.

THEODOR ZUSCHLAG.